United States Patent Office 3,442,584
Patented May 6, 1969

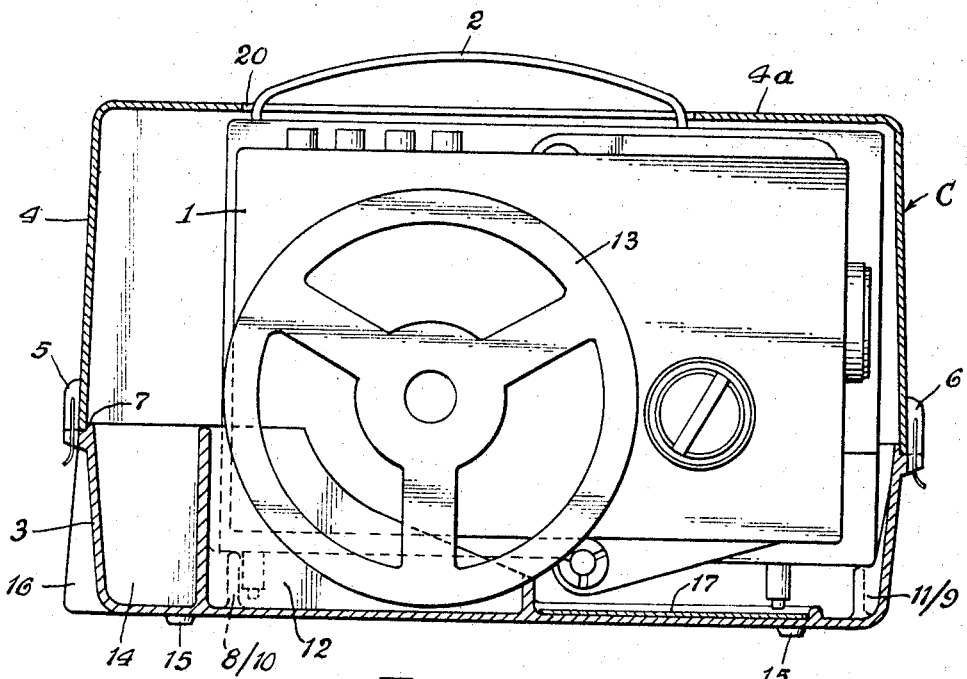

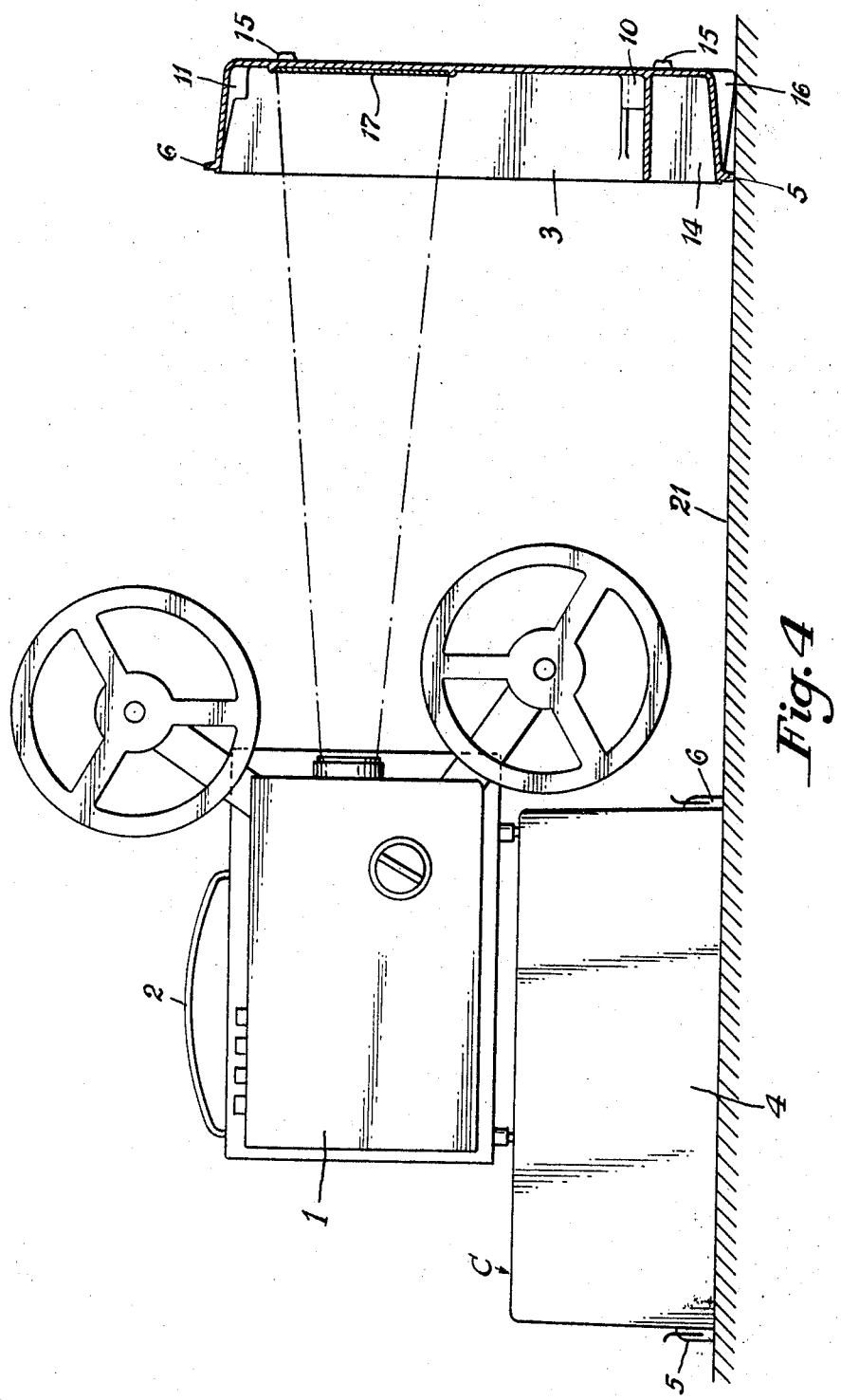

3,442,584
CARRYING CASE FOR A MOTION PICTURE
PROJECTOR
Fritz Krumbein and Dietrich Becker, Stuttgart-Mohringen, and Ulrich Schöttle, Stuttgart, Germany, assignors to Zeiss Ikon Aktiengesellschaft, Stuttgart, Germany, a corporation of Germany
Filed Mar. 9, 1966, Ser. No. 533,027
Claims priority, application Germany, Apr. 1, 1965,
Z 9,789
Int. Cl. G03b 21/14
U.S. Cl. 353—119                    4 Claims

ABSTRACT OF THE DISCLOSURE

A carrying case for a motion picture projector comprising separable lower and upper parts of which the lower part which receives the lower portion of the projector, after the removal of the projector therefrom, may be used as a projection screen when placed vertically on one of its narrow end walls, while the upper part may serve as a raised support for the projector which is adapted to be placed on the upwardly facing top wall of the upper part when the latter with its lower horizontal edge rests on a supporting surface which also supports the vertically positioned lower part.

---

The invention relates to a carrying case for a small film motion picture projector.

It is an object of the invention to provide a carrying case for a small film motion projector which is small and compact in size, permits the storing of the projector and its accessory parts, such as the electric connector cord and film reels, and requires only a few manipulations to set up the projector for operation.

According to another object of the invention, the carrying case comprises a lower part which receives the lower portion of the projector and its accessory parts and also comprises an upper part which encloses the upper portion of the projector and some of the upwardly projecting accessory parts, such as film reels.

Still another object of the invention is to construct the lower part of the case in such a manner that it may be employed as a projection screen, while the upper part of the case may be used as a supporting base for the projector in its operating position.

Another object of the invention is to provide the carrying case in its top wall with an aperture through which a carrying handle attached permanently to the projector projects outwardly so as to permit an easy carrying of the projector even when enclosed in the handleless carrying case.

With these and other objects in mind as will appear hereinafter, the invention will now be described in greater details in the following description with reference to the accompanying drawings, in which:

FIG. 1 is a longitudinal vertical sectional view of the carrying case of the invention with its content;

FIG. 2 is a top plan view of the carrying case but with the top portion removed;

FIG. 4 illustrates the carrying case and the motion picture projector in a position ready for film projection.

Figure 3:
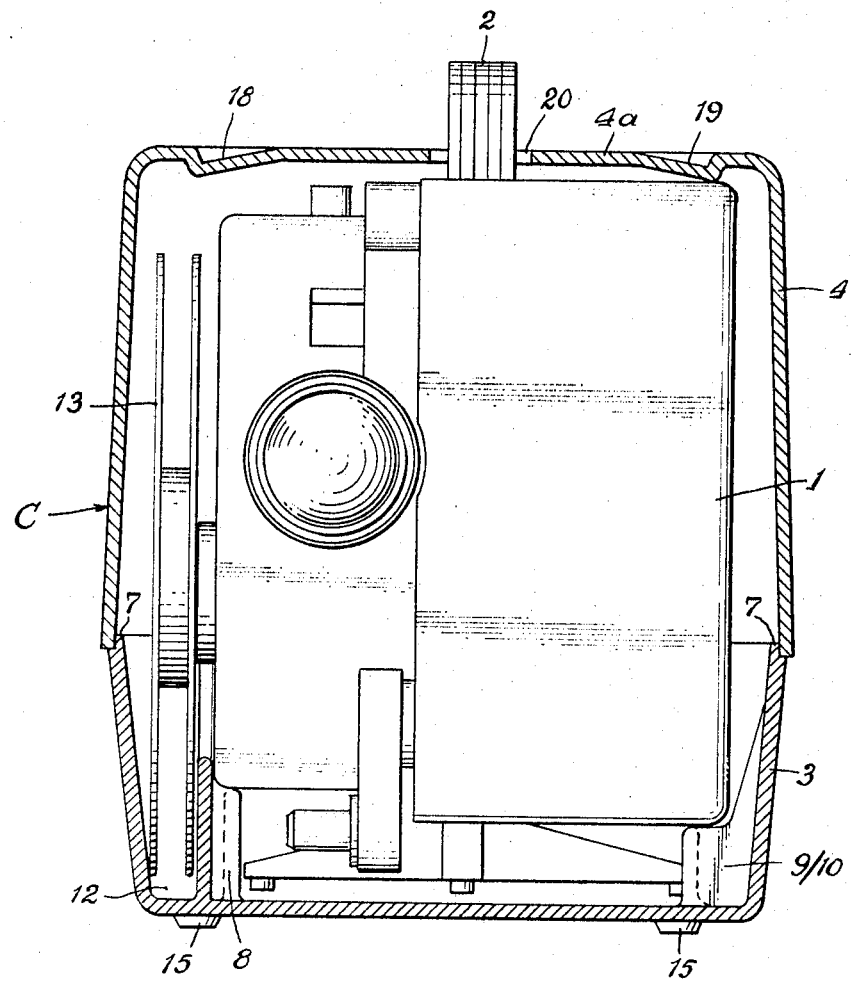
FIG. 3 is a vertical cross-sectional view of the case with a projector therein.

Referring to FIG. 1, a motion picture projector 1 provided on its top wall with a carrying handle 2 is disposed in the lower part 3 of the case C and is covered by the upper part 4 of the case. The lower part 3 and the upper part 4 are adapted to be connected with each other by conventional snap lock devices 5 and 6. A marginal offset flange 7 (FIG. 3) on the lower part 3 of the case C alines the upper part 4 on the lower part 3. Supporting ribs 8, 9, 10 and 11 in the lower part serve for alining and centering the projector 1 in the desired position in the lower part 3. A compartment 12 in the lower part 3 serves for storing an empty reel 13, while another compartment 14 is used for storing the electric connecting cord for the projector and/or for storing one or more reels with films thereon.

The bottom face of the lower part 3 is provided with three supporting feet 15, two at the front and one at the rear. One small side wall of the part 3 is provided with ribs 16 which together with the snap lock device 5 serve as support for the upright position of the part 3 when the latter is used as a projection screen as shown in FIG. 4. The required screen surface 17 is arranged on the large inner face of the bottom of the lower part 3 of the case C.

The upper part 4 of the case C is provided in its top wall 4a with two depressions 18, 19 having inclined supporting surfaces for receiving the two forwardly disposed feet of the projector 1. The top wall 4a is also provided with a rectangular aperture 20 through which the carrying handle 2 on the projector extends outwardly (FIGS. 1 and 3).

When the part 4 serves as support for the projector 1 and the part 3 serves as projection screen as shown in FIG. 4, it is posisble to correct a lateral inclination of the picture on the screen 17 by a lateral displacement of the projector 1 along the oppositely inclined supporting faces formed in the top wall recesses 18, 19 (FIG. 3). One of the two front feet of the projector will slide upwardly on one of the inclined faces while the other front foot of the projector will slide downwardly on its corresponding inclined face. The size of the projection surface 17 is so dimensioned that a conventional table surface is sufficient to cause the projected picture to fill the entire area of the screen 17. The optical axis of the projection objective and the center of the screen 17 have the same distance above the table surface 20.

In the event that the projector 1 is used to project a large picture upon a large screen, it would be possible to employ both superimposed case parts 3 and 4 as a supporting base for the projector.

In order to make the motion picture ready for a projection, the closed carrying case wtih the projector therein is placed on a table. Thereupon the two snap lock devices 5, 6 which connect the two parts 3 and 4 of the case with each other are opened, and the upper part 4 of the case is removed and is placed in position where the projector is to stand for projection. The motion picture projector is now lifted by means of its carrying handle from the lower part of the case and the reel support arms are pivoted outwardly in operative position as shown in FIG. 4, and then the projector is placed on the top of the upper part 4 of the case. The electric connector cord is now removed from its pocket in the lower part 3 of the case, and the empty film reel is also removed and is attached to its respective reel carrying arm. The empty lower part 3 of the case is now placed in an upright position opposite the projector (see FIG. 4) and is used as support for the picture screen 17 which is arranged on the inner face of the bottom wall of the lower part 3 of the case. The side walls of the lower part 3 of the case serve as effective means for keeping stray light away from the picture screen 17. When the projection operation has been completed, the projector is again placed into its carrying case by performing the same manipulation as described but in reversed manner.

What we claim is:

1. A carrying case for small film motion picture projectors, comprising a lower part having a horizontal bottom wall and a horizontal upper edge for receiving and supporting the lower portion of the projector and accessory parts of the same, a separate upper part having a horizontal top wall and a horizontal lower edge for enclosing the upper part of the projector and any one of the accessory parts extending upwardly from the lower part of the case, and means for releasably locking said lower part and said upper part of the case together, the dimensions of said two parts of the case are of such size and proportions that the upper part when positioned with its outer top surface horizontally and facing upwardly may serve as a base support for the projector in its operative position, while the lower part when removed from the upper part and positioned with its bottom wall vertically and horizontaly spaced from said upper part may serve as a support for a picture screen which is arranged on the inner face of said bottom wall and will receive the picture projected by the projector when the latter is placed on the outer face of the top surface of said first part of the case and the upper part is placed on the same horizontal supporting surface as the vertically disposed lower part.

2. A carrying case according to claim 1, in which the outer face of the top wall of the upper part of the case is provided with two spaced depressions having oppositely inclined bottom faces for receiving two of three feet on the projector for permitting a tilting adjustment of the projector by a lateral displacement of the same along said inclined faces.

3. A carrying case according to claim 1, in which the top wall of the upper part of the case is provided with an aperture through which projects outwardly a carrying handle attached to the projector when disposed within said case.

4. A carrying case according to claim 1, in which the lower part of the case is provided on the outside of one of its narrow end walls with feet serving as a support when said lower part is removed from said upper part and arranged in an upright position to serve as a support for a projection screen arranged on the inner face of the bottom wall of said lower part.

References Cited

UNITED STATES PATENTS

| | | |
|---|---|---|
| 1,788,808 | 1/1931 | Stein. |
| 2,847,902 | 8/1958 | D'Incerti. |
| 3,173,330 | 3/1965 | Parker. |

JOHN M. HORAN, *Primary Examiner.*

U.S. Cl. X.R.

206—16